United States Patent
Hayashi (10) Patent No.: US 8,860,761 B2
(45) Date of Patent: Oct. 14, 2014

(54) IMAGE PROCESSING DEVICE, IMAGE PROCESSING METHOD, IMAGE PROCESSING PROGRAM AND COMPUTER-READABLE RECORDING MEDIUM STORING THE PROGRAM

(71) Applicant: Rakuten, Inc., Tokyo (JP)

(72) Inventor: Yasuyuki Hayashi, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 14/234,860

(22) PCT Filed: Dec. 28, 2012

(86) PCT No.: PCT/JP2012/084174
§ 371 (c)(1),
(2), (4) Date: Jan. 24, 2014

(87) PCT Pub. No.: WO2014/103048
PCT Pub. Date: Jul. 3, 2014

(65) Prior Publication Data
US 2014/0253593 A1    Sep. 11, 2014

(51) Int. Cl.
| | | |
|---|---|---|
| *G06T 11/80* | (2006.01) | |
| *G06T 3/00* | (2006.01) | |
| *G06T 7/60* | (2006.01) | |
| *G09G 5/377* | (2006.01) | |
| *G06T 11/60* | (2006.01) | |

(52) U.S. Cl.
CPC ............... *G09G 5/377* (2013.01); *G06T 11/60* (2013.01)
USPC .............................. 345/634; 345/522; 345/619

(58) Field of Classification Search
USPC ......... 345/418, 419, 421, 422, 428, 473, 522, 345/619, 625, 626, 634, 649, 650, 653, 655
See application file for complete search history.

(56) References Cited

U.S. PATENT DOCUMENTS

2011/0234581 A1 *  9/2011  Eikelis et al. ................. 345/419

FOREIGN PATENT DOCUMENTS

| JP | 2002-140581 A | * | 5/2002 | .............. G06F 17/60 |
| JP | 2004-318359 A | * | 11/2004 | .............. G06T 11/80 |
| JP | 2005-242566 A | * | 9/2005 | .............. G06T 11/80 |

OTHER PUBLICATIONS

"VIEWTRY", [online], [searched on Dec. 17, 2012], Internet<URL: http://www.viewtry.com/>.
International Search Report, PCT/JP2012/084174, dated Jan. 29, 2013.

* cited by examiner

*Primary Examiner* — James A Thompson
(74) *Attorney, Agent, or Firm* — Sughrue Mion, PLLC (57) ABSTRACT

An image processing device includes a pierced earring image acquisition unit that acquires a pierced earring image showing a pierced earring including a hook part, a head image acquisition unit that acquires a head image at least including a region where an ear is shown, a pierced earring image specifying unit that specifies an end direction of the hook part in the pierced earring image, a head image specifying unit that specifies a rear of a head in the head image, a superimposition unit that superimposes the pierced earring image onto the head image so that the end direction in the pierced earring image faces to the rear of the head in the head image, and an output unit that outputs the image on which the pierced earring image is superimposed. An image closer to the state where the pierced earring is actually worn in the ear is thereby output.

8 Claims, 11 Drawing Sheets

IMAGE PROCESSING DEVICE, IMAGE PROCESSING METHOD, IMAGE PROCESSING PROGRAM AND COMPUTER-READABLE RECORDING MEDIUM STORING THE PROGRAM

CROSS REFERENCE TO RELATED APPLICATIONS

This application is a National Stage of International Application No. PCT/JP2012/084174 filed Dec. 28, 2012, the contents of all of which are incorporated herein by reference in their entirety.

TECHNICAL FIELD

The present invention relates to an image processing device, an image processing method, an image processing program and a computer-readable recording medium storing the program.

BACKGROUND ART

A technique to superimpose an image of an item that people wear, such as jewelry, on an image of a person and display a composite image is known (for example, see Non Patent Literature 1). In this technique, an image of a selected piece of jewelry is displayed superimposed on an image of a user.

CITATION LIST

Non Patent Literature

NPL1: VIEWTRY, [online], [searched on Dec. 17, 2012], Internet<URL: http://www.viewtry.com/>

SUMMARY OF INVENTION

Technical Problem

Images of pierced earrings on e-commerce sites that sell jewelry and the like are often captured by photographing the pierced earrings placed on a flat table. In the case of capturing an image of pierced earrings made up of main body parts joined to be able to swing and a hook-shaped attachment part (hook part) for attachment to the ear, for example, if the main body parts are placed on a flat table with the front side facing upward, the pierced earrings are photographed in the state where the hook part is rotated by 90 degrees, for example, with respect to the main body parts and the front-rear direction of the hook part is along the horizontal direction compared to when worn in the ears. Thus, the image of the pierced earrings is different from the state they are actually worn in the ears, and therefore when such an image is superimposed on an image of a person, the composite image is unnatural, causing a feeling of strangeness to the user.

In view of the foregoing, an object of the present invention is to superimpose an image of a pierced earring on an image of a person's head in a manner that is closer to the way the pierced earring is actually worn in the ear of the head.

Solution to Problem

In order to solve the above-described problem, an image processing device according to one aspect of the present invention includes a pierced earring image acquisition means configured to acquire a pierced earring image showing a pierced earring including a hook part for attachment to a person's ear, a head image acquisition means configured to acquire a head image at least including a region where an ear is shown, a pierced earring image specifying means configured to specify an end direction of the hook part in the pierced earring image, a head image specifying means configured to specify a rear of a head in the head image, and an output means configured to output the pierced earring image and the head image so that the pierced earring image is displayed superimposed on the head image with the end direction in the pierced earring image facing to the rear of the head in the head image.

An image processing method according to one aspect of the present invention is an image processing method executed by a computer, the method including an acquisition step of acquiring a pierced earring image showing a pierced earring including a hook part for attachment to a person's ear and a head image at least including a region where an ear is shown, a pierced earring image specifying step of specifying an end direction of the hook part in the pierced earring image, a head image specifying step of specifying a rear of a head in the head image, and an output step of outputting the pierced earring image and the head image so that the pierced earring image is displayed superimposed on the head image with the end direction in the pierced earring image facing to the rear of the head in the head image.

An image processing program according to one aspect of the present invention causes a computer to implement a pierced earring image acquisition function to acquire a pierced earring image showing a pierced earring including a hook part for attachment to a person's ear, a head image acquisition function to acquire a head image at least including a region where an ear is shown, a pierced earring image specifying function to specify an end direction of the hook part in the pierced earring image, a head image specifying function to specify a rear of a head in the head image, and an output function to output the pierced earring image and the head image so that the pierced earring image is displayed superimposed on the head image with the end direction in the pierced earring image facing to the rear of the head in the head image.

A computer-readable recording medium according to one aspect of the present invention is a computer-readable recording medium storing an image processing program that causes a computer to implement a pierced earring image acquisition function to acquire a pierced earring image showing a pierced earring including a hook part for attachment to a person's ear, a head image acquisition function to acquire a head image at least including a region where an ear is shown, a pierced earring image specifying function to specify an end direction of the hook part in the pierced earring image, a head image specifying function to specify a rear of a head in the head image, and an output function to output the pierced earring image and the head image so that the pierced earring image is displayed superimposed on the head image with the end direction in the pierced earring image facing to the rear of the head in the head image.

According to the above-described aspect, the pierced earring image and the head image are output so that the pierced earring image is displayed superimposed on the head image with the end direction of the hook part in the pierced earring image facing to the rear of the head in the head image, and it is thereby possible to display an image that is closer to the state the pierced earring is actually worn in the ear. Therefore, the provided image is not unnatural, which does not cause a feeling of strangeness to a user so much.

In an image processing device according to another aspect, in a case where the pierced earring image shows images of a pair of pierced earrings, the output means selects an image of a pierced earring where an end direction of a hook part in the pierced earring image substantially coincides with a rear direction of a face in a head image, out of the images showing the pair of pierced earrings, as an image to be superimposed on the head image.

According to the above aspect, the image of the pierced earring where the end direction of the hook part in the pierced earring image substantially coincides with the rear direction of the head in the head image is selected out of the images showing the pair of pierced earrings as an image to be superimposed on the head image, and thereby an image that is closer to the state the pierced earring is actually worn in the ear is displayed based on the pierced earring image showing a pair of pierced earrings.

In an image processing device according to another aspect, in a case where the pierced earring image shows an image of a single pierced earring, when an end direction of a hook part in the image of the pierced earring shown in the pierced earring image substantially coincides with a rear direction of a head in a head image, the output means outputs the image of the pierced earring as an image to be superimposed on the head image, and when an end direction of a hook part in the image of the pierced earring shown in the pierced earring image does not substantially coincide with a rear direction of a head in a head image, the output means outputs a reverse image that is a mirror reversed version of the image of the pierced earring as an image to be superimposed on the head image.

According to the above aspect, when the end direction of the hook part in the image showing a single pierced earring does not substantially coincide with the rear direction of the head in the head image, a reverse image that is a mirror reversed version of the image of the pierced earring processed so that the end direction of the hook part substantially coincides with the rear direction in the head image is output, and thereby an image that is closer to the state the pierced earring is actually worn in the ear is displayed based on the pierced earring image showing a single pierced earring.

In an image processing device according to another aspect, the hook part has a hook shape having an end portion to go through an earlobe, and the output means specifies a point of attachment in the hook part that comes into contact with an ear when worn and outputs the image of the pierced earring where an image of a part on a side of the end portion from the point of attachment in the hook part is deleted as an image to be superimposed on the head image.

According to the above aspect, the image of the pierced earring in which a part of the hook part that is hidden behind the ear and invisible when worn is deleted is output and thereby a more natural image can be displayed.

In an image processing device according to another aspect, the output means specifies an uppermost part of a region where a pierced earring is shown in the pierced earring image as the point of attachment. According to the above aspect, the point of attachment in the image of the pierced earring can be specified appropriately and easily.

In an image processing device according to another aspect, the pierced earring image specifying means performs specifying a direction of the hook part when a region where a pierced earring is shown is segmented by a line segment connecting an uppermost point of the region where the pierced earring is shown in the pierced earring image and a point positioned down below the uppermost point by a predetermined length, and the pierced earring image specifying means does not perform specifying a direction of the hook part when the region where the pierced earring is shown is not segmented by the line segment.

In order to display a natural image by superimposing the pierced earring image on the head image, when a part used for attachment to the ear is an asymmetrical hook part, there is a high necessity of determination of the direction. According to the above aspect, when the region where the pierced earring is shown is segmented by the line segment, it is determined that the pierced earring in the pierced earring image has the hook part. The necessity of determination of the direction of the hook part is thereby appropriately determined.

In an image processing device according to another aspect, the output means specifies a part in which the hook part of a pierced earring is to be worn in the head image by searching for the head image using a template indicating characteristics of a part in which the hook part is to be worn, and superimposes the pierced earring image on the head image so that the hook part comes at the part on which the hook part is to be worn in the head image.

According to the above aspect, a part in which the pierced earring is to be worn in the head image is specified accurately, and the image of the pierced earring is thereby superimposed on an appropriate position.

Advantageous Effects of Invention

According to the above aspect, it is possible to superimpose an image of a pierced earring on an image of a person's head in a manner that is closer to the way the pierced earring is actually worn in the ear of the head.

BRIEF DESCRIPTION OF DRAWINGS

FIG. 3 is a diagram showing an example of a screen that is displayed when an image processing device is applied to an e-commerce site or the like.

DESCRIPTION OF EMBODIMENTS

An embodiment of the present invention is described hereinafter in detail with reference to the appended drawings. Note that, in the description of the drawings, the same or equivalent elements are denoted by the same reference symbols, and the redundant explanation thereof is omitted.

Figure 1:
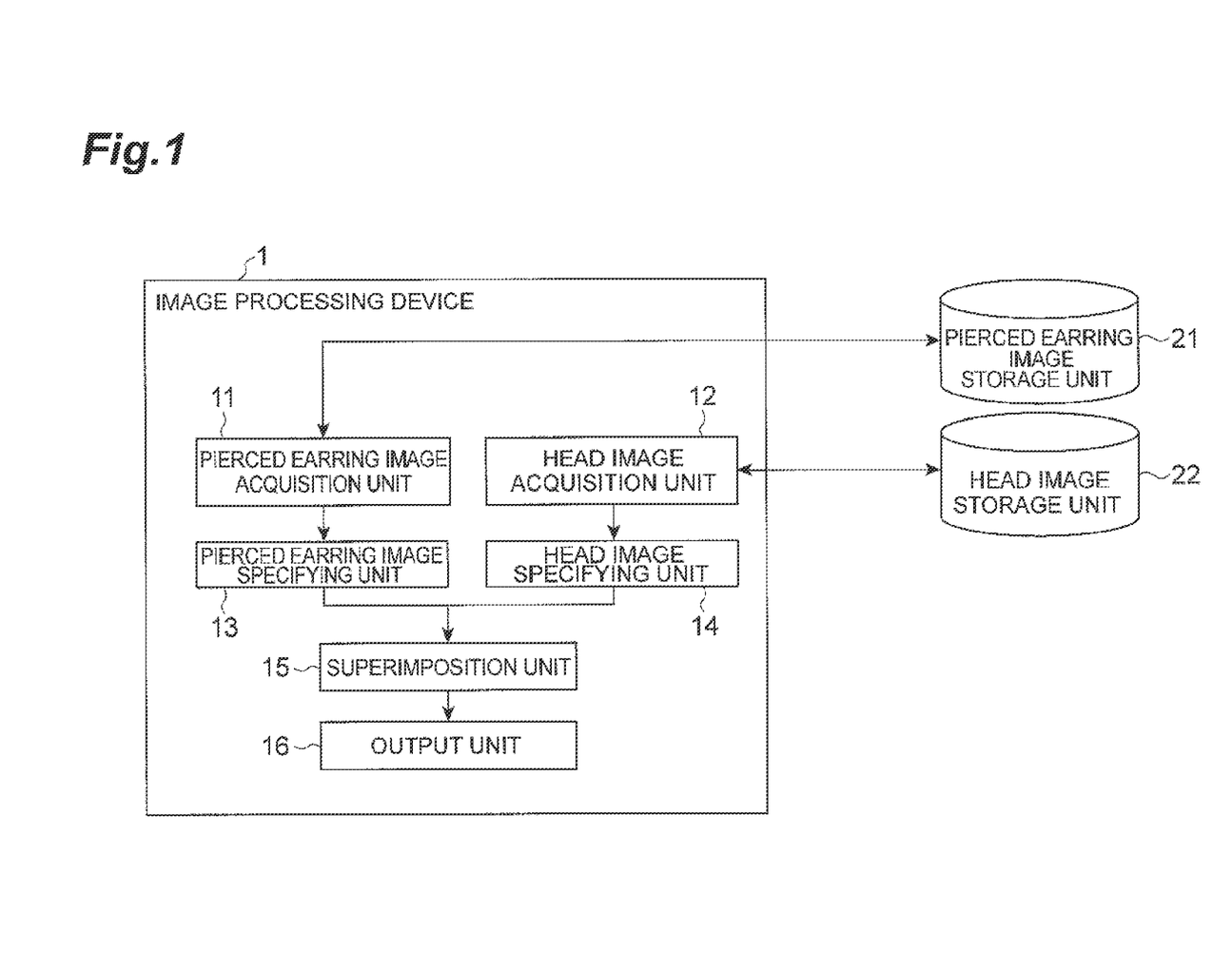
FIG. 1 is a block diagram showing a functional configuration of an image processing device.

FIG. 1 is a block diagram showing a functional configuration of an image processing device 1 according to this embodiment. The image processing device 1 is a device that superimposes an image of a pierced earring to be worn in the ear of a person on an image of a person at least including an ear part. The pierced earring includes an attachment part for attachment to the ear of a person. The image processing device 1 according to this embodiment is applicable to an e-commerce site that sells items such as jewelry, for example.

As shown in FIG. 1, the image processing device 1 according to this embodiment functionally includes a pierced earring image acquisition unit 11 (pierced earring image acquisition means), a head image acquisition unit 12 (head image acquisition means), a pierced earring image specifying unit 13 (pierced earring image specifying means), a head image specifying unit 14 (head image specifying means), a superimposition unit 15 (output means), and an output unit 16 (output means). Further, the functional units 11 to 16 of the image processing device 1 can access storage means such as a pierced earring image storage unit 21 and a head image storage unit 22. Note that the image processing device 1 can configured in a server that can communicate with a user terminal through a network. Further, the image processing device 1 may be configured in a device such as a smartphone or a personal computer.

Figure 2:
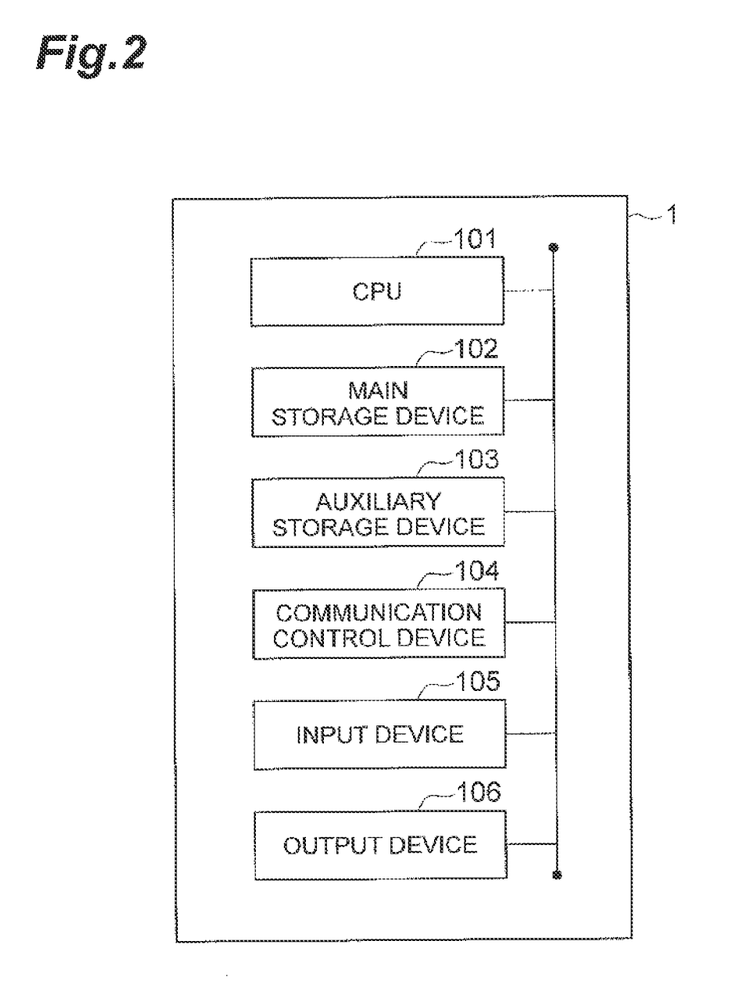
FIG. 2 is a diagram showing a hardware configuration of an image processing device.

FIG. 2 is a hardware configuration diagram of the image processing device 1. As shown in FIG. 2, the image processing device 1 is physically configured as a computer system that includes a CPU 101, a main storage device 102 such as memory like RAM and ROM, an auxiliary storage device 103 such as a hard disk, a communication control device 104 such as a network card, input device 105 such as a keyboard and a mouse, an output device 106 such as a display and the like. Note that, when the image processing device 1 is configured in a server, the image processing device 1 does not need to include the input device 105 and the output device 106.

The functions shown in FIG. 1 are implemented by loading given computer software (image processing program) onto hardware such as the CPU 101 or the main storage device 102 shown in FIG. 2, making the communication control device 104, the input device 105 and the output device 106 operate under control of the CPU 101, and performing reading and writing of data in the main storage device 102 or the auxiliary storage device 103. Data and database required for the processing is stored in the main storage device 102 or the auxiliary storage device 103.

Prior to describing the functional units of the image processing device 1, the item image storage unit 21 and the model image storage unit 22 are described hereinafter. The pierced earring image storage unit 21 is a storage means that stores pierced earring images in which pierced earrings are shown. The pierced earring images are images that show pierced earrings sold in e-commerce sites, for example. The pierced earring image storage unit 21 may store the pierced earring images in advance.

The head image storage unit 22 is a storage means that stores head images showing a head at least including a region where an ear is shown. The head images may be stored in advance or uploaded by users. Further, the head images may be images that show a user's head that is acquired in real time.

Figure 3:
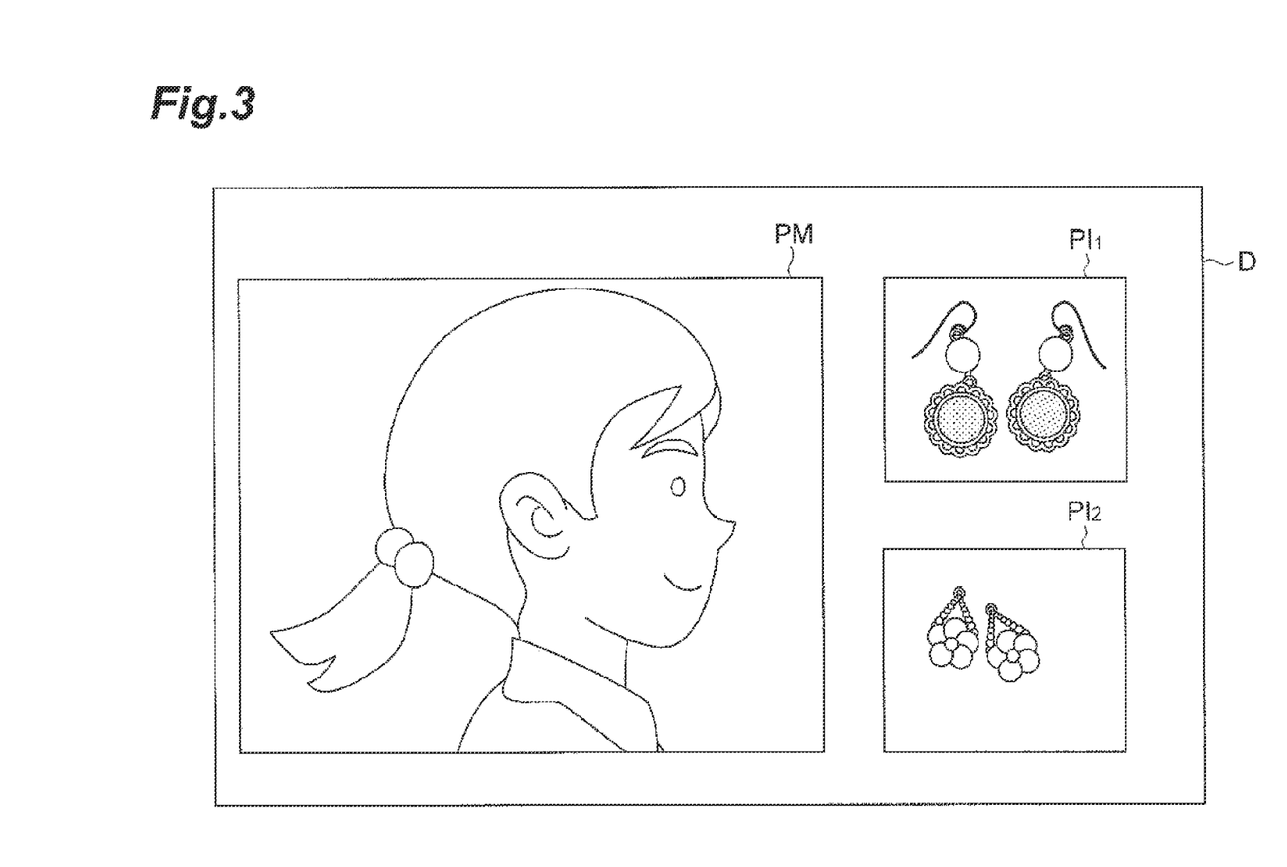

FIG. 3 is a diagram showing an example of a screen D that is displayed in the case where the image processing device 1 is applied to an e-commerce site or the like, for example. As shown in FIG. 3, the image processing device 1 outputs a plurality of pierced earring images $PI_1$ and $PI_2$ acquired from the pierced earring image storage unit 21 and a head image PM acquired from the head image storage unit 22 to the screen D.

Figure 4:
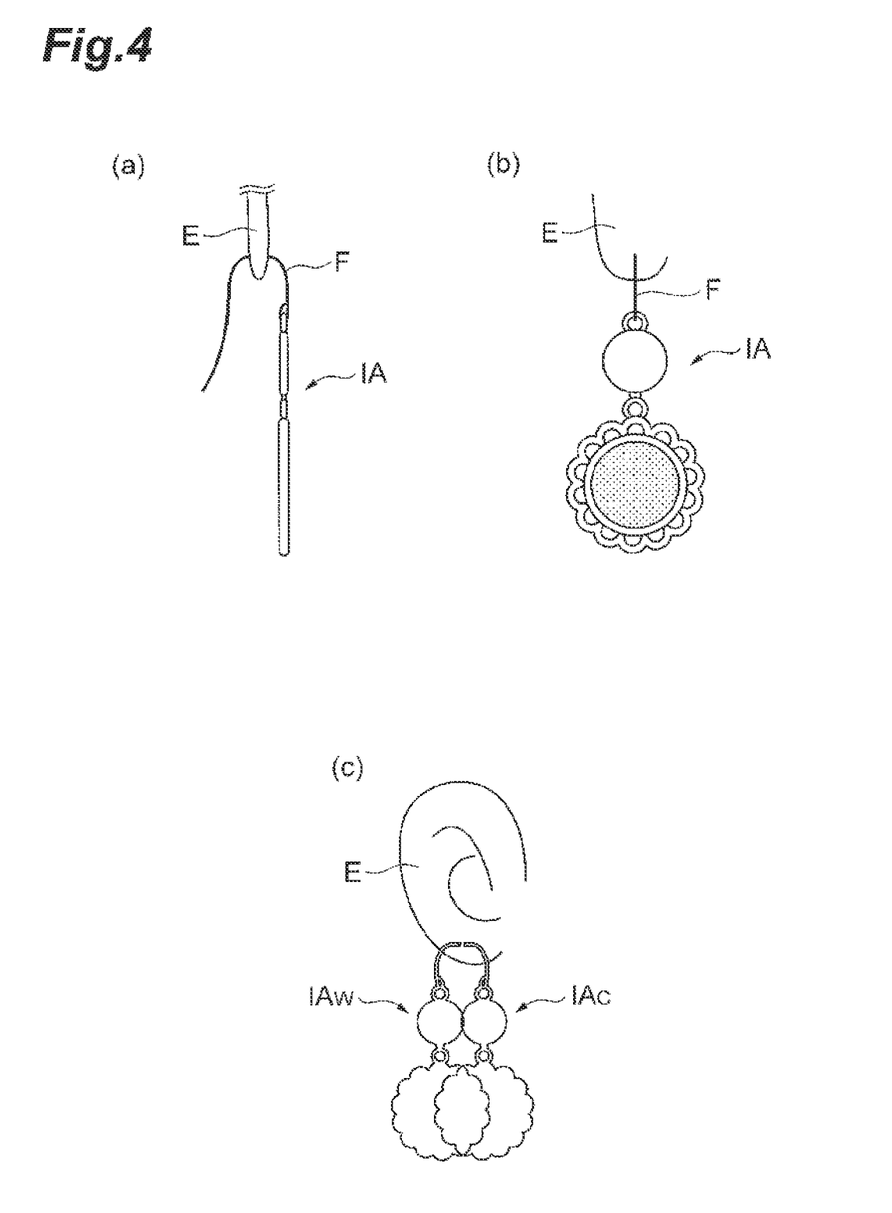
FIGS. 4(a) and 4(b) are diagrams showing the state where a pierced earring is actually worn in the ear.
FIG. 4(c) is a diagram showing a desirable example and an undesirable example of the state where a pierced earring image is superimposed on a head image.

The state where a pierced earring is actually worn in the ear is described hereinafter with reference to FIG. 4. FIGS. 4(a) and 4(b) show the state where a pierced earring IA is worn in an ear E, and FIG. 4(a) is a diagram when viewed from the side of the head, and FIG. 4(b) is a diagram when viewed from the front of the head. FIG. 4(c) is a diagram showing a desirable example and an undesirable example of the state where a pierced earring image is superimposed on a head image.

As shown in FIGS. 4(a) and 4(b), the end of a hook part F for attaching the pierced earring IA to the ear goes through the ear from the front to the rear. On the other hand, as shown in FIG. 3, the front-rear direction of the hook part when worn is rotated with respect to the main body parts by 90 degrees and shown in the left-right direction in the pierced earring image $PI_1$. In this manner, the relative positions of the main body parts and the hook part of the pierced earring in the pierced earring image are different from those when the pierced earring is actually worn.

In the case of superimposing the pierced earring image that is often captured in this manner onto the head image showing a right ear E, for example, as shown in FIG. 4(c), it is desirable to superimpose the pierced earring image $IA_C$ in which the end of the hook part faces to the left, and it is not desirable to superimpose the pierced earring image $IA_W$ in which the end of the hook part faces to the right. The main body parts and the curved portion of the hook part of the pierced earring shown in the pierced earring image $IA_W$ are positioned rearwards compared to when actually worn, and therefore an image on which the pierced earring image $IA_W$ is superimposed is unnatural.

The functional units of the image processing device 1 are described hereinbelow. The pierced earring image acquisition unit 11 is a unit that acquires a pierced earring image. Pierced earrings are one type of jewelry that are worn in the ears of people and includes an attachment part for attachment to the ear. There are several variations in the shape of the attachment part, such as hook type and stud type. When pierced earrings are placed on a level surface, a stud-type attachment part is generally in symmetrical shape, whereas a hook part, which is a hook-type attachment part, is in asymmetrical shape. Thus, the hook part in the pierced earring image is shown in asymmetrical shape. The pierced earring image acquisition unit 11 acquires the pierced earring image from the pierced earring image storage unit 21.

The head image acquisition unit 12 is a unit that acquires a head image from the head image storage unit 22. The head image may be an image that is stored in advance or may be an image that is uploaded by a user by photographing the user's head.

The pierced earring image specifying unit 13 is a unit that specifies the end direction of a hook part in a pierced earring image. As described above, because the attachment part is shown in asymmetrical shape in a pierced earring image when an attachment part of a pierced earring is a hook type, the pierced earring image specifying unit 13 determines whether an attachment part of a pierced earring in a pierced earring image is a hook part or a stud-type part prior to determining the direction of the attachment part.

Figure 5:
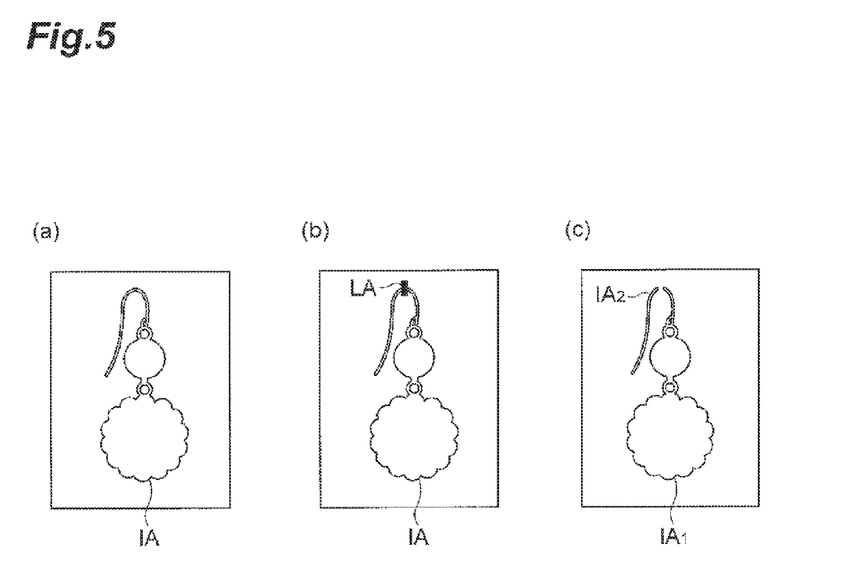
FIGS. 5(a), 5(b) and 5(c) are diagrams showing examples of determination of a type of an attachment part.

FIG. 5 is a diagram showing examples of determination of a type of an attachment part by the pierced earring image specifying unit 13. As shown in FIG. 5(a), the pierced earring image specifying unit 13 extracts a region IA where a pierced earring is shown from the pierced earring image $PI_1$ shown in FIG. 3 using a known image processing technique. Next, as shown in FIG. 5(b), the pierced earring image specifying unit 13 inserts a line segment LA that connects the uppermost point of the region IA where the pierced earring is shown in the pierced earring image and a point positioned down below the uppermost point by a predetermined length. Then, as shown in FIG. 5(c), it is assumed that, when the region IA where the pierced earring is shown is segmented into two regions, a region $IA_1$ and a region $IA_2$, by the line segment LA, the pierced earring image specifying unit 13 determines that the attachment part of the pierced earring shown in the pierced earring image $PI_1$ is a hook part and then makes determination about the direction of the end portion of the hook part.

Figure 6:
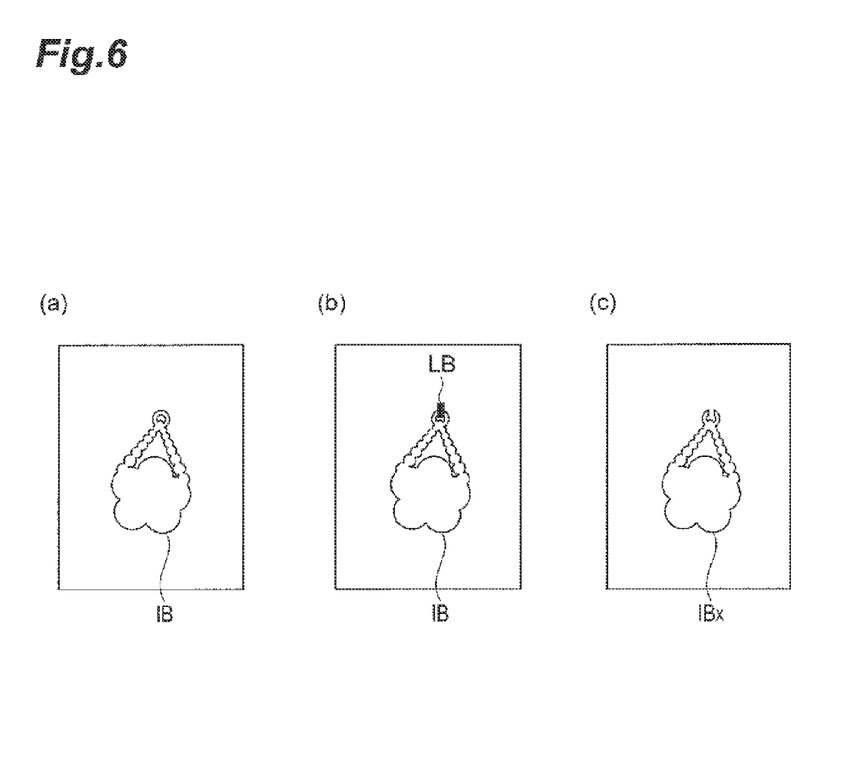
FIGS. 6(a), 6(b) and 6(c) are diagrams showing examples of determination of a type of an attachment part.

FIG. 6 is a diagram showing another example of determination of a type of an attachment part by the pierced earring image specifying unit 13. As shown in FIG. 6(a), the pierced earring image specifying unit 13 extracts a region IB where a pierced earring is shown from the pierced earring image $PI_2$ shown in FIG. 3 using a known image processing technique. Next, as shown in FIG. 6(b), the pierced earring image specifying unit 13 inserts a line segment LB that connects the uppermost point of the region IB where the pierced earring is shown in the pierced earring image and a point positioned down below the uppermost point by a predetermined length. Then, as shown in a region $IB_X$ in FIG. 6(c), it is assumed that, when the region IB where the pierced earring is shown is not segmented by the line segment LB, the pierced earring image specifying unit 13 determines that the attachment part of the pierced earring shown in the pierced earring image $PI_2$ is a symmetrical shape such as a stud type, for example, and does not make determination about the direction of the end of the attachment part.

The length of the line segments LA and LA is set to be more than the width of a wire that constitutes the hook part and less than the diameter of a typical round stud-type attachment part. By determining a type of the attachment part as described above, the necessity of determination of the direction of the attachment part is appropriately determined.

When it is determined that the attachment part is a hook part, the pierced earring image specifying unit 13 performs determination about the end direction of the hook part. Specifically, because the directions, such as up, down, left and right, of the pierced earring image are specified, and pierced earrings are typically photographed with the attachment part facing upward, the pierced earring image specifying unit 13 determines which of the left and right directions each of the front and rear directions (the end direction) of the hook part when worn in the ear corresponds to in the pierced earring image.

Figure 7:
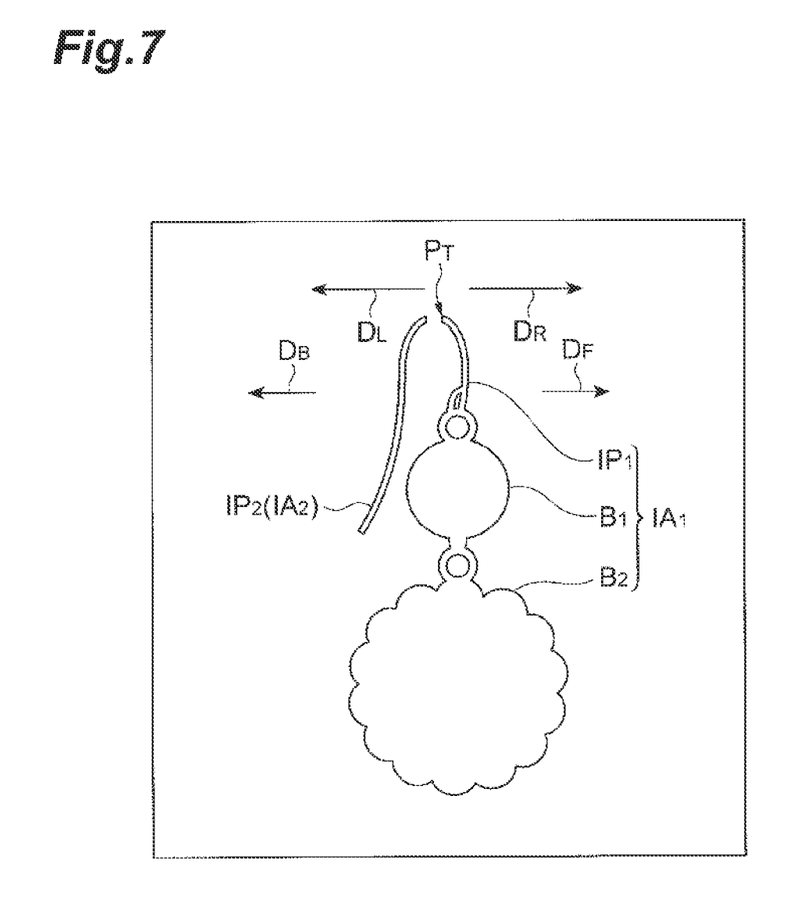
FIG. 7 is a diagram showing an example of determination of a direction of an attachment part.

FIG. 7 is a diagram showing an example of determination of the direction of an attachment part. In FIG. 7, an image of a pierced earring that is segmented into two regions, a region $IA_1$ and a region $IA_2$, is shown (FIG. 5(c)). The pierced earring image specifying unit 13 calculates the area of each of the segmented regions $IA_1$ and $IA_2$, and determines the region $IA_2$ having a smaller area as a region including an end portion $IP_2$ of the hook part and determines the region $IA_1$ having a larger area as a region including main body parts $B_1$ and $B_2$.

The pierced earring image specifying unit 13 determines the direction in which the end portion $IP_2$ of the attachment part is positioned with respect to the region $IA_1$ including the main body parts of the pierced earring as an end direction $D_B$ of the hook part. On the other hand, the pierced earring image specifying unit 13 determines the direction in which the region $IA_1$ including the main body parts of the pierced earring is positioned with respect to the end portion $IP_2$ as a front direction $D_F$ of the hook part when worn. Then, the pierced earring image specifying unit 13 determines that the end direction $D_B$ and the front direction $D_F$ of the hook part respectively correspond to the left direction $D_L$ and the right direction $D_R$ in the pierced earring image.

The head image specifying unit 14 is a unit that specifies the rear of the head in the heard image. Specifically, because the directions, such as up, down, left and right, of the head image PM are specified, the head image specifying unit 14 determines which of the left and right directions each of the front and rear directions of the head corresponds to in the head image. The determination can be made using a known image analysis technique. For example, the head image specifying unit 14 can extract regions where the eye and ear are shown from the head image PM and determine the direction of the face based on the positional relationship of those. For example, when the region of the ear is on the right side of the region of the eye in the head image, the rear of the head faces to the left in the head image. On the other hand, when the region of the ear is on the left side of the region of the eye in the head image, the rear of the head faces to the right in the head image.

The superimposition unit 15 is a unit that superimposes a pierced earring image on a head image so that the end direction of a hook part in the pierced earring image substantially coincides with the rear direction of the head in the head image. The superimposition unit 15 specifies a part in which the pierced earring is to be worn in the head image prior to superimposition of the image.

Figure 8:
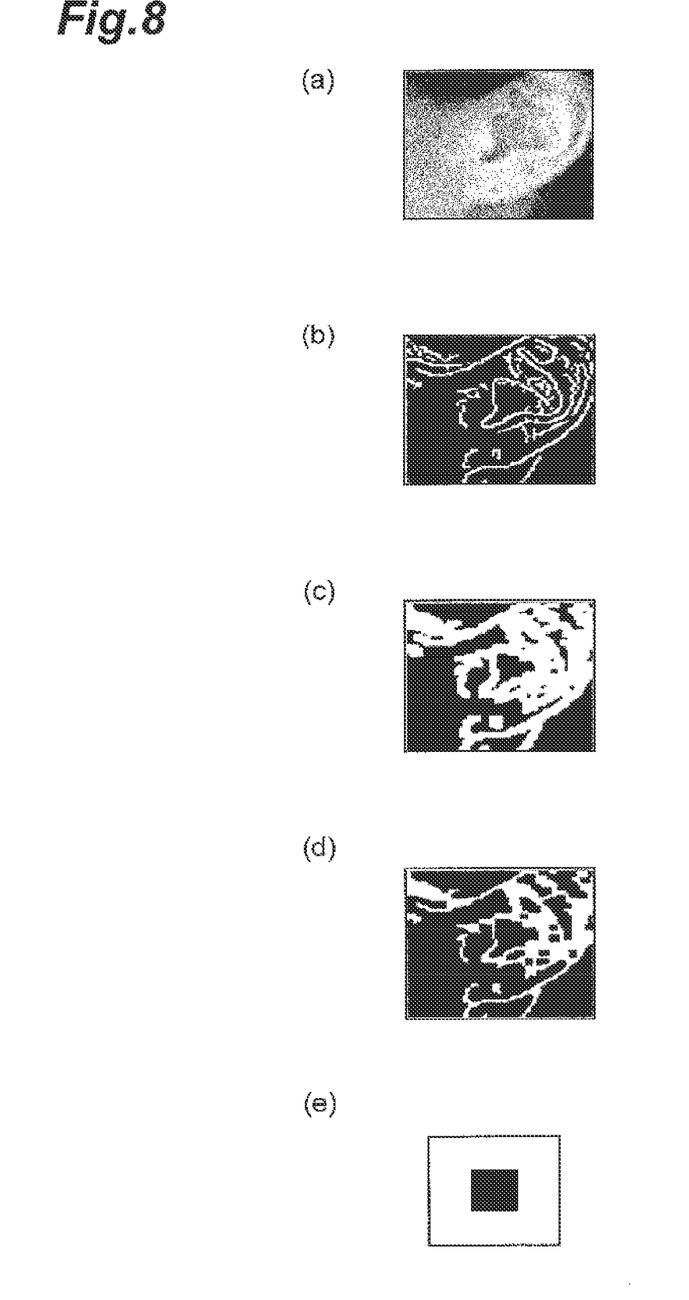
FIGS. 8(a) to 8(d) are views showing preprocessing prior to matching using a template.
FIG. 8(e) is a view showing a template representing the characteristics of a pierced hole.

The superimposition unit 15 can specify a part in which the pierced earring is to be worn in the head image by searching for (matching) the head image using a template indicating the characteristics of a part in which the pierced earring is to be worn. FIG. 8 shows views to describe an example of processing of specifying a part in which the pierced earring is to be worn. FIGS. 8(a) to 8(d) show preprocessing prior to matching using a template. First, the superimposition unit 15 extracts an image of a part in which the pierced earring is to be worn from the head image. In the example of FIG. 8(a), the image of the ear part on which a pierced earring is to be worn is extracted. Next, as shown in FIG. 8(b), the superimposition unit 15 performs edge extraction on the image of the ear part by a known image processing technique. Then, the superimposition unit 15 performs dilation as shown in FIG. 8(c) and erosion as shown in FIG. 8(d), which are known image processing techniques, to make a pierced hole through which the pierced earring is worn apparent. The dilation and erosion are performed repeatedly in accordance with the characteristics of the image.

After that, the superimposition unit 15 performs matching on the head image in which a pierced hole is made apparent using a template indicating the characteristics of the pierced hole as shown in FIG. 8(e) and thereby specifies a part in which the pierced earring is to be worn.

Note that the superimposition unit 15 may specify a relative position that is set in advance in the extracted image of the ear part as a part on which the item is to be worn as shown in FIG. 8(a), for example. For example, the superimposition unit 15 can specify the position that is 10% the height of the extracted ear image from the lower end of the ear image and 30% the width of the ear image from the left end as a position in which the item is to be worn.

When the pierced earring image shows images of a pair of pierced earrings such as the pierced earring image $PI_1$ (see FIG. 3), the superimposition unit 15 selects the image of the pierced earring in which the end direction of the hook part in the pierced earring image substantially coincides with the rear direction of the head in the head image out of the images showing the pair of pierced earrings in the pierced earring image, and then superimposes the selected image of the pierced earring onto the head image. For example, when the front direction and the rear direction of the head correspond to the right direction and the left direction of the head image, respectively, the superimposition unit 15 selects the image of the pierced earring in which the front direction $D_F$ and the end direction $D_B$ of the hook part correspond to the right direction $D_R$ and the left direction $D_L$ of the pierced earring image as shown in FIG. 7, for example, and superimposes the selected image onto the head image.

Further, when the pierced earring image shows an image of a single pierced earring, the superimposition unit 15 superimposes the image of the pierced earring onto the head image when the end direction of the hook part in the image of the pierced earring shown in the pierced earring image substantially coincides with the rear direction of the head in the head image.

On the other hand, when the end direction of the hook part in the image of the pierced earring shown in the pierced earring image does not substantially coincides with the rear direction of the head in the head image, the superimposition unit 15 superimposes a reverse image that is a mirror reversed version of the image of the pierced earring onto the head image. For example, when the front direction and the rear direction of the head correspond to the left direction and the right direction of the head image, respectively, and the image of a single pierced earring in which the front direction $D_F$ and the end direction $D_B$ of the hook part correspond to the right direction $D_R$ and the left direction $D_L$ of the pierced earring image as shown in FIG. 7, for example, is shown in the pierced earring image, the superimposition unit 15 superimposes the reverse image that is a mirror reversed version of the image of the pierced earring onto the head image.

Figure 9:
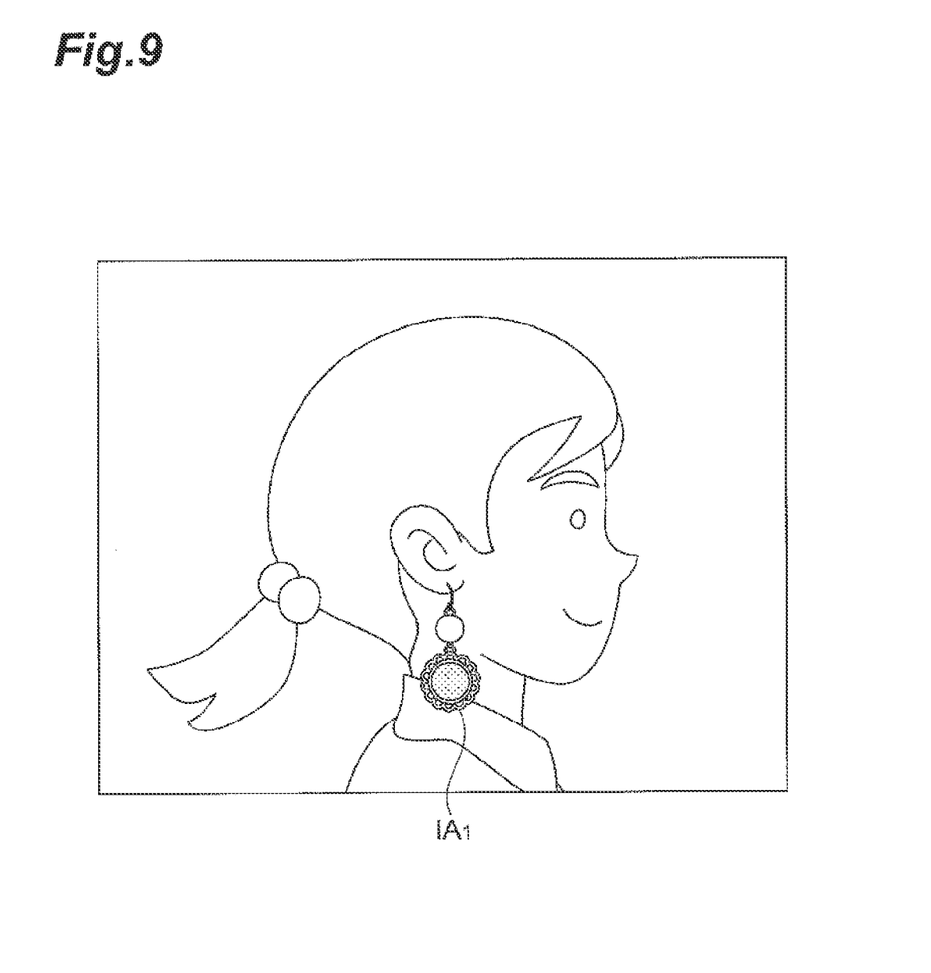
FIG. 9 is a diagram showing an example of a composite image.

FIG. 9 is a diagram showing an example of an image superimposed by the superimposition unit 15. When superimposing a pierced earring image onto a head image, the superimposition unit 15 specifies a point of attachment that comes into contact with the ear when worn in the hook part and superimposes the image of the pierced earring in which an image of a part that is on the side of the end portion from the point of attachment is deleted onto the head image. As shown in FIG. 7, the hook part has the end portion $IP_2$ to go through the earlobe. In such a case, the superimposition unit 15 superimposes the image $IA_1$ of the pierced earring in which the image of the portion $IP_2$ that is on the side of the end portion from the point of attachment $P_T$ is deleted onto the head image as shown in FIG. 9. The image of the pierced earring in which a part of the hook-shaped attachment part which is hidden behind the ear and invisible when worn is deleted is superimposed onto the head image, and therefore a more natural image can be output. Note that the superimposition unit 15 can specify the uppermost part of the image of the pierced earring as the point of attachment $P_T$.

The output unit 16 is a unit that outputs a pierced earring image and a head image so that the pierced earring image is displayed superimposed on the head image with the end direction in the pierced earring image facing to the rear of the head in the head image. To be specific, the output unit 16 outputs the image superimposed by the superimposition unit 15. The output unit 16 outputs the image to a user terminal, for example. Further, the output unit 16 may output the image to a display.

Figure 10:
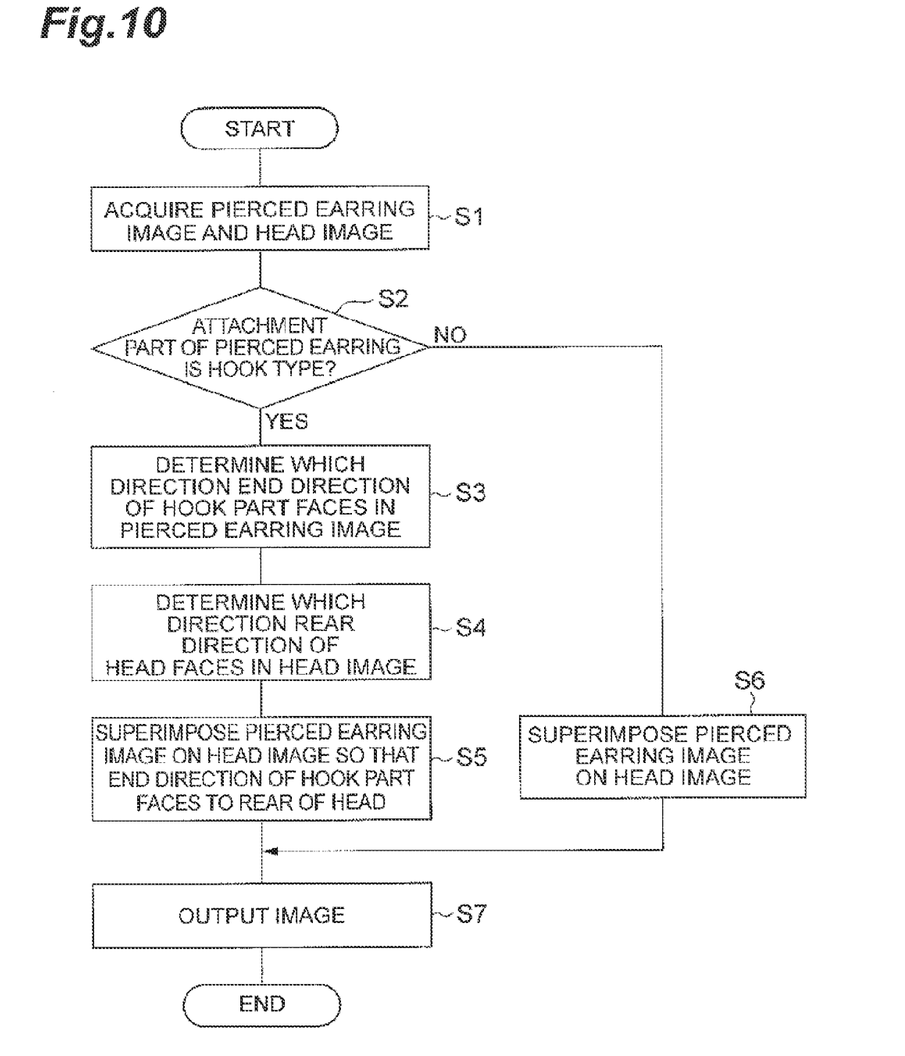
FIG. 10 is a flowchart showing an example of a process of an image processing method in an image processing device.

An image processing method according to this embodiment is described hereinafter with reference to FIG. 10. FIG. 10 is a flowchart showing an example of a process of the image processing method in the image processing device 1 shown in FIG. 1.

First, the pierced earring image acquisition unit 11 acquires a pierced earring image from the pierced earring image storage unit 21. Further, the head image acquisition unit 12 acquires a head image from the head image storage unit 22 (S1).

Next, the pierced earring image specifying unit 13 determines whether the attachment part of the pierced earring in the pierced earring image is a hook type or not (S2). When it is determined that the attachment part is a hook type, the procedure proceeds to Step S3. On the other hand, when it is not determined that the attachment part is a hook type, the procedure proceeds to Step S6.

In Step S3, the pierced earring image specifying unit 13 determines which of the left and right directions the end direction of the hook part when worn in the ear corresponds to in the pierced earring image (S3). Further, the head image specifying unit 14 determines which of the left and right directions the rear direction of the head corresponds to in the head image (S4). Note that any of the processing steps S3 and S4 may be performed first or the both may be performed simultaneously.

Then, the superimposition unit 15 superimposes the pierced earring image on the head image so that the end direction of the hook part in the pierced earring image substantially coincides with the rear direction in the head image (S5). In Step S5, the superimposition unit 15 can specify a part in which the pierced earring is to be worn in the head image by searching for (matching) the head image using a template indicating the characteristics of a part in which the pierced earring is to be worn.

On the other hand, when it is not determined that the attachment part is a hook type in Step S2, the superimposition unit 15 superimposes the pierced earring image on the head image in Step S6 without determining the direction of the attachment part and generates a composite image (S6). Then, in Step S7, the output unit 16 outputs the image where the pierced earring image is superimposed on the head image by the superimposition unit 15 (S7).

Figure 11:
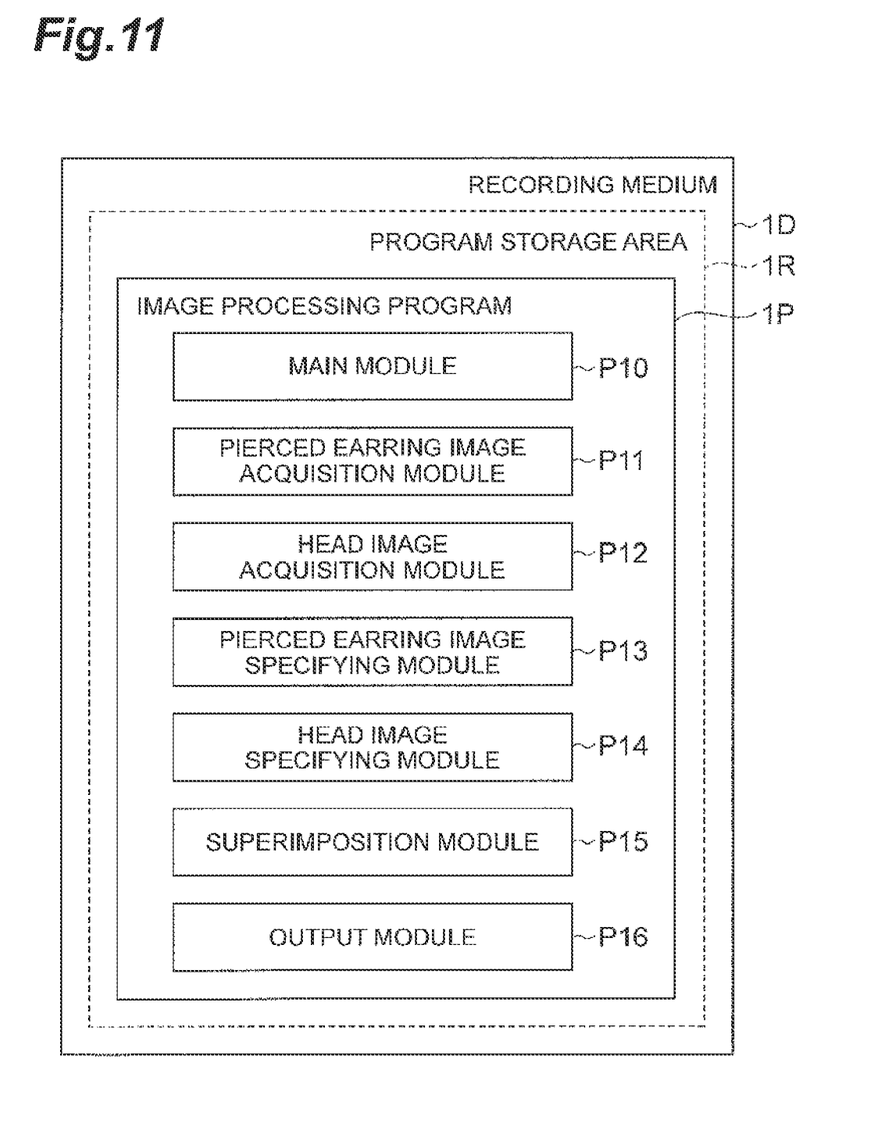
FIG. 11 is a diagram showing a configuration of an image processing program.

An image processing program that causes a computer to function as the image processing device 1 is described hereinafter with reference to FIG. 11. An image processing program 1P includes a main module P10, a pierced earring image acquisition module P11, a head image acquisition module P12, a pierced earring image specifying module P13, a head image specifying module P14, a superimposition module P15, and an output module P16.

The main module P10 is a part that exercises control over the image processing. The functions implemented by executing the pierced earring image acquisition module P11, the head image acquisition module P12, the pierced earring image specifying module P13, the head image specifying module P14, the superimposition module P15 and the output module P16 are equal to the functions of the pierced earring image acquisition unit 11, the head image acquisition unit 12, the pierced earring image specifying unit 13, the head image specifying unit 14, the superimposition unit 15 and the output unit 16 of the image processing device 1 shown in FIG. 1, respectively.

The image processing program 1P is provided through a storage medium such as CD-ROM or DVD-ROM or semiconductor memory, for example. Further, the information processing program 1P may be provided as a computer data signal superimposed onto a carrier wave over a communication network.

According to the image processing device 1, the image processing method, the image processing program 1P and a computer-readable recording medium storing the program described above, a pierced earring image and a head image are output so that the pierced earring image is displayed superimposed on the head image in such a manner that the end direction of a hook part of a pierced earring in the pierced earring image faces to the rear of a head in the head image, and it is thereby possible to display an image that is closer to the state the pierced earring is actually worn in the ear. Therefore, the provided image is not unnatural, which does not cause a feeling of strangeness to a user so much.

Hereinbefore, the present invention has been described in detail with respect to the embodiment thereof. However, the present invention is not limited to the above-described embodiment. Various changes and modifications may be made therein without departing from the scope of the invention.

REFERENCE SIGNS LIST

1 ... image processing device, 11 ... pierced earring image acquisition unit, 12 ... head image acquisition unit, 13 ... pierced earring image specifying unit, 14 ... head image specifying unit, 15 ... superimposition unit, 16 ... output unit, 21 ... pierced earring image storage unit, 22 ... head image storage unit, 23 ... item information storage unit, 1D ... storage medium, 1P ... image processing program, P10 ... main module, P11 ... pierced earring image acquisition module, P12 ... head image acquisition module, P13 ... pierced earring image specifying module, P14 ... head image specifying module, P15 ... superimposition module, P16 ... output module

The invention claimed is:

1. An image processing device comprising:
a pierced earring image acquisition unit configured to acquire a pierced earring image showing a pierced earring including a hook part for attachment to a person's ear;
a head image acquisition unit configured to acquire a head image at least including a region where an ear is shown;
a pierced earring image specifying unit configured to specify an end direction of the hook part in the pierced earring image;
a head image specifying unit configured to specify a rear of a head in the head image; and
an output unit configured to output the pierced earring image and the head image so that the pierced earring image is displayed superimposed on the head image with the end direction in the pierced earring image facing to the rear of the head in the head image.

2. The image processing device according to claim 1, wherein
in a case where the pierced earring image shows images of a pair of pierced earrings,
the output unit selects an image of a pierced earring where an end direction of a hook part in the pierced earring image substantially coincides with a rear direction of a face in a head image, out of the images showing the pair of pierced earrings, as an image to be superimposed on the head image.

3. The image processing device according to claim 1, wherein
in a case where the pierced earring image shows an image of a single pierced earring,
when an end direction of a hook part in the image of the pierced earring shown in the pierced earring image substantially coincides with a rear direction of a head in a head image, the output unit outputs the image of the pierced earring as an image to be superimposed on the head image, and
when an end direction of a hook part in the image of the pierced earring shown in the pierced earring image does not substantially coincide with a rear direction of a head in a head image, the output unit outputs a reverse image that is a mirror reversed version of the image of the pierced earring as an image to be superimposed on the head image.

4. The image processing device according to claim 1, wherein
the hook part has a hook shape having an end portion to go through an earlobe, and
the output unit specifies a point of attachment in the hook part that comes into contact with an ear when worn and outputs the image of the pierced earring where an image of a part on a side of the end portion from the point of attachment in the hook part is deleted as an image to be superimposed on the head image.

5. The image processing device according to claim 4, wherein
the output unit specifies an uppermost part of a region where a pierced earring is shown in the pierced earring image as the point of attachment.

6. The image processing device according to claim 1, wherein
the pierced earring image specifying unit performs specifying a direction of the hook part when a region where a pierced earring is shown is segmented by a line segment connecting an uppermost point of the region where the pierced earring is shown in the pierced earring image and a point positioned down below the uppermost point by a predetermined length, and
the pierced earring image specifying unit does not perform specifying a direction of the hook part when the region where the pierced earring is shown is not segmented by the line segment.

7. The image processing device according to claim 1, wherein
the output unit specifies a part in which the hook part of a pierced earring is to be worn in the head image by searching for the head image using a template indicating characteristics of a part in which the hook part is to be worn, and superimposes the pierced earring image on the head image so that the hook part comes at the part on which the hook part is to be worn in the head image.

8. An image processing method executed by a computer, the method comprising:
an acquisition step of acquiring a pierced earring image showing a pierced earring including a hook part for attachment to a person's ear and a head image at least including a region where an ear is shown;
a pierced earring image specifying step of specifying an end direction of the hook part in the pierced earring image;
a head image specifying step of specifying a rear of a head in the head image; and
an output step of outputting the pierced earring image and the head image so that the pierced earring image is displayed superimposed on the head image with the end direction in the pierced earring image facing to the rear of the head in the head image.

* * * * *